(12) United States Patent
Mori et al.

(10) Patent No.: US 8,353,225 B2
(45) Date of Patent: Jan. 15, 2013

(54) ACTUATOR

(75) Inventors: Junya Mori, Mino (JP); Tetsuya Sakai, Mino (JP)

(73) Assignee: Nippon Thompson Co., Ltd., Minato-Ku, Tokyo (JP)

( * ) Notice: Subject to any disclaimer, the term of this patent is extended or adjusted under 35 U.S.C. 154(b) by 358 days.

(21) Appl. No.: 12/635,096

(22) Filed: Dec. 10, 2009

(65) Prior Publication Data

US 2010/0139426 A1 Jun. 10, 2010

(30) Foreign Application Priority Data

Dec. 10, 2008 (JP) ................................. 2008-314890

(51) Int. Cl.
 *F16H 29/02* (2006.01)
 *F16C 29/06* (2006.01)
 *F16C 29/04* (2006.01)

(52) U.S. Cl. ............................. 74/89.32; 384/43; 384/49

(58) Field of Classification Search .................. 74/89.23, 74/89.32, 89.33; 384/15, 49, 55, 59, 43; 277/551, 572, 906

See application file for complete search history.

(56) References Cited

U.S. PATENT DOCUMENTS

| | | | |
|---|---|---|---|
| 5,755,515 A * | 5/1998 | Senjo et al. | 384/45 |
| 6,880,975 B2 * | 4/2005 | Ishihara et al. | 384/45 |
| 6,902,322 B2 * | 6/2005 | Matsumoto | 384/15 |
| 7,458,720 B2 * | 12/2008 | Kuwabara | 384/15 |
| 2008/0157607 A1 * | 7/2008 | Scheich et al. | 310/12 |

FOREIGN PATENT DOCUMENTS

| | | |
|---|---|---|
| JP | 6272713 A | 9/1994 |
| JP | 8126247 A | 5/1996 |
| JP | 11159529 A | 6/1999 |

* cited by examiner

*Primary Examiner* — Justin Krause
*Assistant Examiner* — Adam D Rogers
(74) *Attorney, Agent, or Firm* — Browdy and Neimark, PLLC

(57) ABSTRACT

An actuator has a frame and a slider body which are both made of extruded shapes of light-metal alloy. A first rail member is fastened to the frame by means of a simple construction. An upper sealing member is placed between the frame and the slider body. With the actuator constructed as stated earlier, the frame is an elongated extrusion of U-shape in transverse section whose side walls have first recesses of dovetail configuration to fit over first rail members and flanges. A slider has therein the slider body having second recesses of rectangular shape to fit over second rail members. There is further provided a driving unit to force the slider with respect to the frame. The first rail members each have the wedged configuration including tapered contours and dents, while the second rail members each have the rectangular shape.

1 Claim, 4 Drawing Sheets

ACTUATOR

FIELD OF THE INVENTION

The present invention relates to an actuator adapted for the use in a variety of machinery including assembling machines, measurement instruments, semiconductor manufacturing equipments, and so on, the actuator having an elongated frame, a slider and a driving unit.

BACKGROUND OF THE INVENTION

Actuators adapted for the sliding means to move and guide linearly any object are recently availed in extensively increased fields. Modern actuators are needed to be less in weight and height in transverse section, and more compact in construction. The actuators of the sorts as stated earlier have been used in, for example assembling machines, measurement instruments, various machines, industrial robots, semiconductor manufacturing equipments, and so on.

An example of the prior actuators is disclosed in, for example the Japanese Laid-Open Patent Application No. H08-126 247, which is composed of a base and a slider movable with respect to the base. With the prior actuator, the base and the slider are both made of extrusions of light-metal alloys. The base has lengthwise guide rails while the slider also has guide rails same in transverse section with the rail on the base. All the guide rails on the base and slider are formed by grinding or plastic working. The guide rails along their preselected locations are subjected to heat treating or hardening to prepare raceway grooves to allow rolling elements running through there. The guide rails are fastened to their respective base and the slider and further raceway grooves are worked with grinding operation to have gothic-arched contour in transverse section.

Further for example in the Japanese Laid-Open Patent Application No. H11-159 529 there is disclosed a linear motion guide unit in which a guide rail is made of a composite of a rail member with a guide rail support. With the composite, the rail member is first assembled with the guide rail support in a way sidewise flanges of the rail member fit into mating grooves cut in advance. The assembly of the rail member and the guide rail support is pulled or drawn to apply a load to the rail member.

A prior linear motion guide unit is disclosed in, for example the Japanese Laid-Open Patent Application No. H06-272 713 in which a track construction is made up of a base and a rail member that fits into grooves cut in the base while a moving construction is made up of a slider and a guide member that fits into grooves cut in the slider. With the linear motion guide unit constructed as stated earlier, a contact angle $\theta$ between a rolling element and a raceway groove made on the track construction is set in a range of from 30° to 40° wherein $\theta$ refers to an angle formed by a horizontal line passing through a center of the rolling element and a line extending from a contact point between the raceway groove and the rolling element to a center of the rolling element.

The prior actuator as recited earlier, nevertheless, is generally bulky in construction. The recent actuator in which the slider is driven unidirectionally is needed adding increasingly less weight and taking up less space and less production cost. Especially, there is a need of advanced actuators which are compact in construction, more particularly, less height in transverse section, more simplified in construction and less expensive in production.

SUMMARY OF THE INVENTION

The present invention, therefore, has as its principal object to overcome the problems stated earlier and, in particular, to provide an actuator adapted for the use in a variety of machinery including assembling machines, measurement instruments, semiconductor manufacturing equipments, and so on. The present invention relates to an actuator adapted for the use in a variety of machinery including assembling machines, measurement instruments, semiconductor manufacturing equipments, and so on. The major concept of the present invention is to provide the actuator that has a frame to be fastened to base including a machine bed and so on, and a slider to move and guide unidirectionally relatively to the base any object mounted thereon. Another concept of the present invention is to provide an actuator weighing less, compact in construction, inexpensive in production, and helping get the overall machine slimmer than ever.

The present invention is concerned with an actuator; comprising an elongated frame of U-shape in transverse section defined with a bottom and a pair of side walls upright at sidewise opposing edges of the bottom, a slider having a slider body therein and lying between the side walls of the elongated frame in a way moving lengthwise of the side walls by virtue of more than one rolling element, a driving unit forcing to move the slider with respect to the frame, first rail members fastened to inward surfaces of the side walls, one to each side wall, the first rail members each having a first raceway groove to allow the rolling element to run through, and second rail members fastened to side surfaces of the slider body facing the inward surfaces of the side walls, one to each side surface, the second rail members having second raceway grooves in opposition to the first raceway grooves;

wherein the frame on the side walls has first recesses of dovetail configuration in transverse section to fit over the first rail members and flanges extending to form upper edges of the first recesses;

wherein the first rail members each have a wedged configuration complementary to the dovetail configuration of the first recess, the wedged configuration being defined with tapered contours coming into mating with the first dovetail recess and dents lying next to the tapered contours; and wherein the first rail members are inserted into the first recesses and held in the first recesses by the flanges that are forcibly deformed against the first rail member to come into engagement at a distal end thereof with the relative dent of the rail member.

In one aspect of the present invention, an actuator is provided in which the side walls each have a concave of V-shape lying lengthwise just above the first recess with the flange correspondingly in reverse to the concave, and an upper sealing member is held on the slider body in a fashion a lip thereof reaches deep into the concave to make a close engagement with a wall surface of the concave.

In another aspect of the present invention, there is provided an actuator in which the slider body has second recesses of rectangular shape in opposition to the first recesses in the frame and pockets lying in parallel and just above the second recesses to hold therein the upper sealing members.

In another aspect of the present invention, there is provided an actuator in which the frame is an extruded shape of light-metal alloy having the first recesses of dovetail configuration and the flanges, and the slider body is an extruded shape of light-metal alloy having the second recesses and the pockets.

In a further another aspect of the present invention, there is provided an actuator in which the first rail member is a drawn shape of stainless steel having the wedged configuration which is defined with the tapered contours and the dents complementary to the dovetail configuration of the first recesses, and the second rail member is a drawn shape of stainless steel having the rectangular shape complementary to the second recess in the slider body.

With the actuator constructed as stated earlier, the first and second rail members are firmly secured to the frame and the slider body, respectively, which are both made of the extruded shape of light-metal alloy. Especially, the constructional features of the present invention reside in contrivances to easily and simply fasten the first rail member to the frame and make it easier to install the upper sealing member between the frame and the slider body, closing up tightly the race between the raceway grooves.

Moreover, the frame has the first recess of dovetail configuration while the first rail member to be fastened to the frame has the wedged configuration that fits snugly into conform to the first recess. This dovetail connection is better to resist any deformation and keep their assembly steadier.

In contrast, the second recess in the slider is made in a just rectangular shape in transverse section. This makes it easier to cut the second recess in the slider, even if small in size, in the correct location with accuracy and further to install properly the second rail member to the slider.

DETAILED DESCRIPTION OF THE PREFERRED EMBODIMENTS

The actuator of the present invention will be well used in a diversity of machinery including assembling apparatus, testing/measuring instruments, processing machines, industrial robots, semiconductor manufacturing equipments, and so on.

Figure 1:
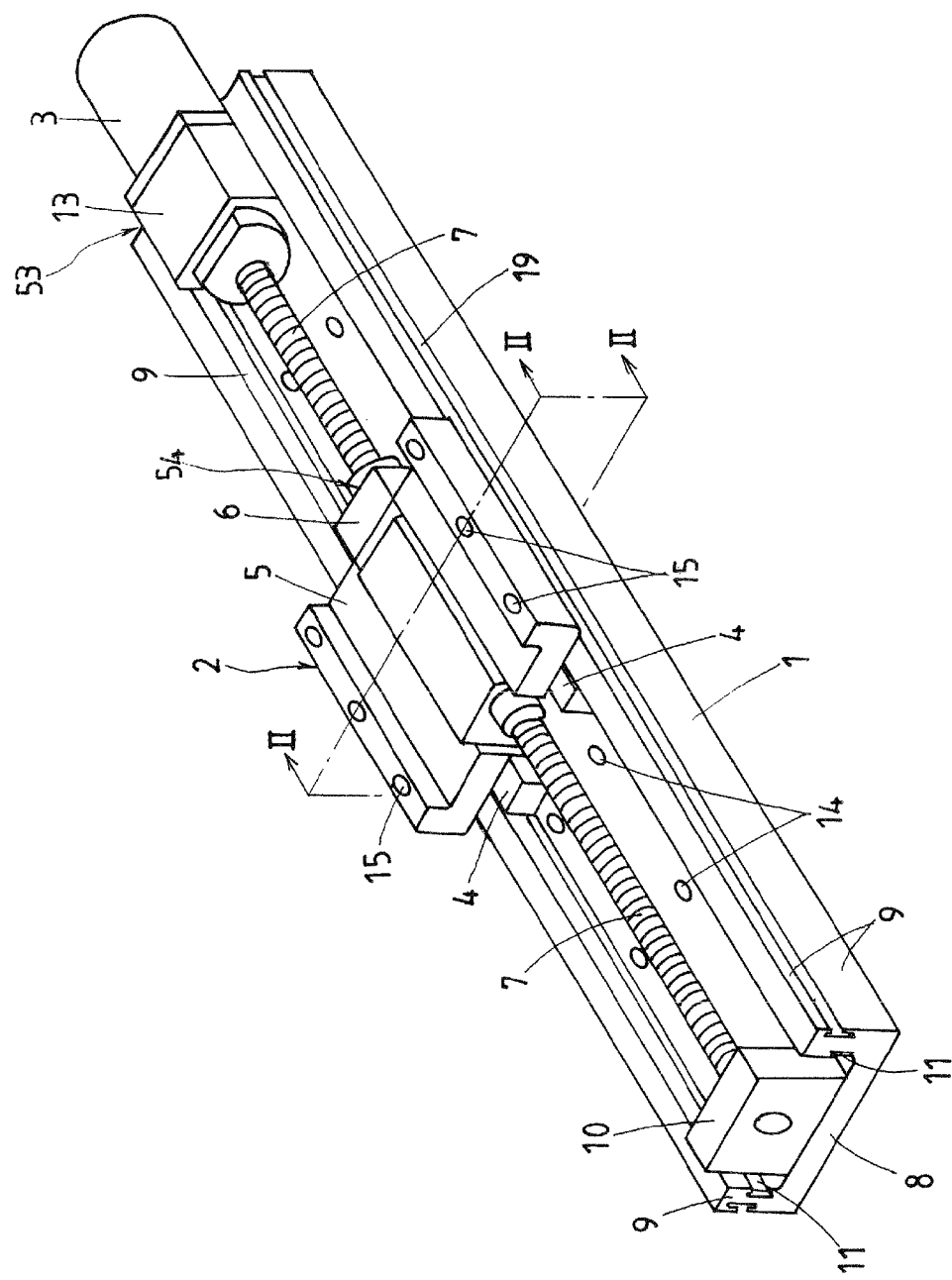
FIG. 1 is a schematic view in perspective showing a preferred embodiment of an actuator according to the present invention.
Figure 2:
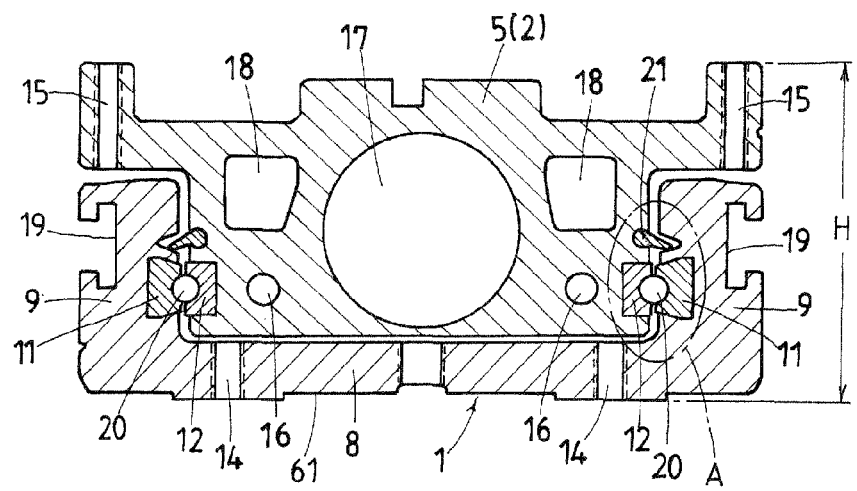
FIG. 2 is a view in transverse section of the actuator of FIG. 1, the view being taken on a plane of the line II-II of FIG. 1 to show only essential components closely related to the present invention.

Referring now in detail to the accompanying drawings, a preferred embodiment of an actuator according to the present invention will be explained below. The actuator of the present invention, as shown in FIGS. 1 and 2, is mainly composed of an elongated frame 1, a slider 2 movable in one direction lengthwise of the frame 1 and a driving unit 53 having a motor 3 to energize the slider 2. The driving unit 53 is comprised of a ball-screw set 54 having a lead screw 7 held for rotation at opposite ends thereof with an end support 10 and a motor support 13 through bearings, not shown, and a lead nut 6 mating with the lead screw 7 and having mounted the slider 2 thereon, and the motor 3 to drive the lead screw 7. The frame 1 has threaded holes 14 spaced away from each other at regular intervals lengthwise of the frame 1, which are used to fasten the frame 1 to any base such as machine bed or the like.

With the actuator of the present invention, especially, the frame 1 and a body 5 of the slider 2 are both made of extrusions of light alloy, which weigh less and cost less in production. Moreover, first and second rail members 11 and 12 to be fastened to the frame 1 and the slider body 5, respectively, are made of steel alloy such as stainless steel and the like, which are drawn or pulled to the desired shape and worked to give high strength to raceway grooves 33 and 34 on the rail members 11 and 12

Figure 3:
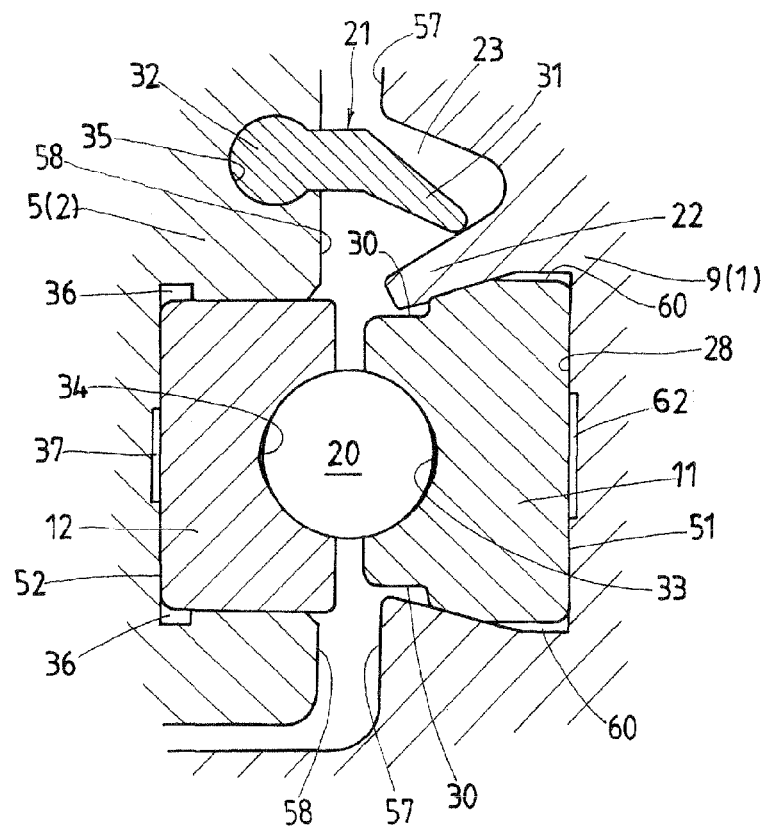
FIG. 3 is a fragmentary enlarged view in transverse section of the actuator to illustrate in detail a location encircled with a sign A in FIG. 2.
Figure 4:
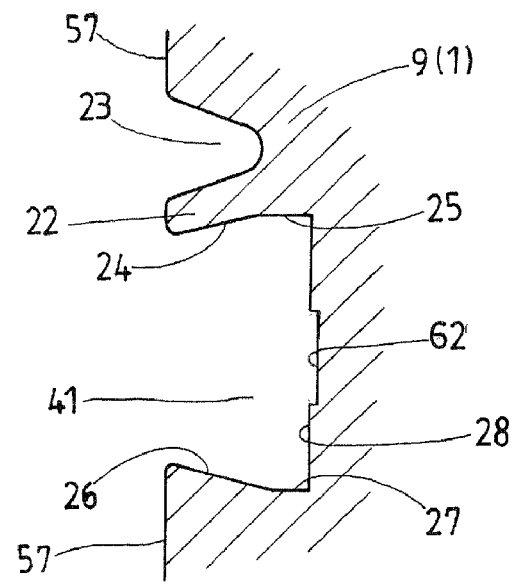
FIG. 4 is a fragmentary enlarged view in transverse section of a frame of extruded shape which is a half-finished product for the actuator of FIG. 2, the view showing in detail a location encircled with A in FIG. 2.
Figure 6:
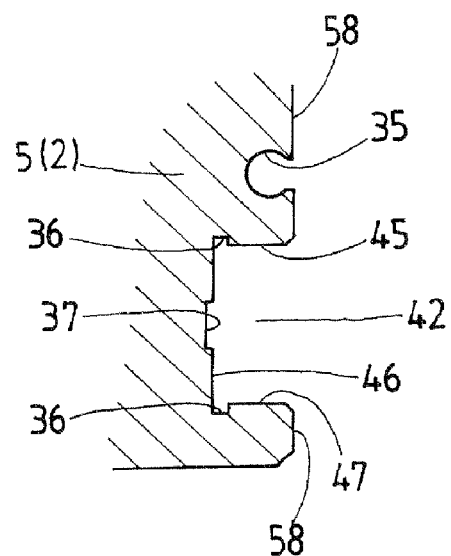
FIG. 6 is a fragmentary enlarged view in transverse section of a slider of extruded shape which is a half-finished product for the actuator of FIG. 2, the view showing in detail a location encircled with the sign A in FIG. 2.

With the actuator constructed according to the present invention, light-metal alloy including aluminum alloy and so on is extruded to the frame 1 of U-shape in transverse section as shown in FIG. 2, which has a bottom 8 and a pair of upright side walls 9 extending lengthwise along widthwise opposite side edges of the bottom 8. Upon extruding operation, the frame 1 is made to have a unique contour as shown in FIGS. 2 to 4 including a first recess 41 to fit over the first rail member 11, a concave 23 lying above the first recess 41, a relief cut 61 on the underneath of the bottom 8, and a groove 19 of T-shape in transverse section cut on an outward surface of the side wall 9. Like the frame 1, light-metal alloy including aluminum alloy and so on is extruded to the slider body 5 as shown in FIGS. 2, 3 and 6, which has a contour especially shown in FIG. 6 having a second recess 42 to fit over the second rail member 12, a pocket 35 to hold a sealing member 21 therein, an opening 17 into which the lead nut fits, and a hollow 18 made for weight reduction. The extrusion for the frame 1 is cut at every desired length and then made with threaded holes 14 while the extrusion for the slider body 5 after separated at every preselected length is made with threaded holes 15 that are used to mount any parts thereon. The slider body 5 finished further has a bore 16 serving as a return passage to allow the rolling element running through there.

The actuator of the present invention is generally composed of the elongated frame 1 of the extrusion of light-metal alloy, the frame 1 having U-shape in transverse section defined by the bottom 8 and the paired upright side walls 9 extending lengthwise along widthwise opposite side edges of the bottom 8, the slider 2 having the slider body 5 of the extruded shape of light-metal alloy, the slider 2 being placed between the sidewise opposed side walls 9 of the frame 1 in a way movable lengthwise of the frame 1 by virtue of the rolling elements 20, and the driving unit 53 to force the slider 2 backward and forward relatively to the frame 1. On the inside of the side wall 9 of the frame 1, there is fastened the first rail member 11 having the raceway groove 33 along which the rolling elements 20 are guided in a rolling manner. On a side 58 of the slider body 5 lying opposite to the side wall 9 of the frame 1, there is held the second rail member 12 in a way the raceway groove 34 thereon is in opposition to the raceway groove 33 of the first rail member 11.

With the actuator constructed as stated earlier, the frame 1 upon extrusion operation is simultaneously made on the side wall 9 thereof with the first recess 41 like dovetail viewed in transverse section and a flange 22 extending like an eaves out of any one edge, for example an upper edge of the first recess 41. The first rail member 11 is made in a wedged configuration in transverse section complementary to the first dovetail-like recess 41 of the frame 1. The first rail member 11 of wedged configuration has tapered contours 38 and 43 coming into mating with relative tapered contours 24 and 26 of the first dovetail recess 41, and dents 30 lying next to the tapered contours 38 and 43. The first rail member 11 fits into the first recess 41 and the flange 22 while pressing down the first rail member 11 comes into engagement at a distal end thereof with the relative dent 30 of the rail member 11 to keep the rail member 11 inside the first recess 41 of the frame 1. On the side wall 9 in the actuator, there is made the concave 23 of V-shaped in transverse section lying lengthwise above the first recess 41 with the flange 22 correspondingly in reverse to the concave 23. The upper sealing member 21 is held on the slider body 5 in a fashion a lip 31 thereof reaches deep into the concave 23 to make a close engagement with a wall surface of the concave 23, performing sealing effect.

On an inward surface 57 defining the side wall 9 of the frame 1, the first recess 41 into which the first rail member 11 fits as shown in FIG. 4 is formed while extruding the shape of the frame 1. More especially, the first recess 41 forms lengthwise on the inward surface 57 of the frame 1 as the light-metal alloy is extruded into the continuous shape of the frame 1. The first recess 41 formed in the frame 1 has the dovetail-like contour in transverse section, which conforms to the wedged contour of the first rail member 11 that is introduced snugly into the first recess 41 from any one end of the frame 1. More especially, the first recess 41 of dovetail contour is defined by the upside and downside tapered contours 24 and 26 which are farther away from each other to get the recess 41 larger in width as they go deep from their opening edges, straight contours 25 and 27 extending deep in parallel with each other from the tapered contours 24 and 26 to a bottom 28 so as to keep the width of the recess 41 constant, the bottom 28 lying perpendicular to the straight contours 25 and 27 and having a relief 62 for excess adhesive. As viewed in transverse section, the flange 22 is provided on only the upside of the first recess 41 and, moreover, the concave 23 of V-shaped is formed lengthwise above the flange 22. The concave 23 is intended to get access of any tool to flange 22 easier to make elastic deformation of the flange 22. The upper sealing member 21 extends deep into the concave 23. Upon extruding operation of the frame 1, thus, the concave 23 is shaped lengthwise above the first recess 41 with correspondingly yielding the flange 22 in reverse to the concave 23.

Figure 5:
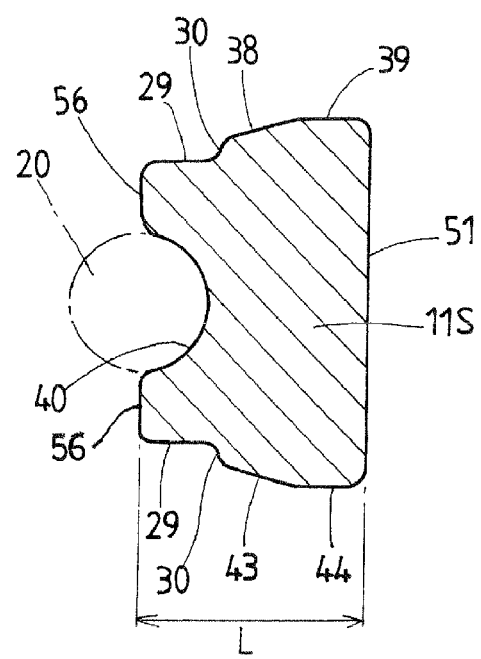
FIG. 5 is a fragmentary enlarged view in transverse section of a first rail member of drawn shape which is a half-finished product for the actuator of FIG. 2, the view showing in detail a location encircled with the sign A in FIG. 2.

Referring to FIG. 5, there is shown a half-finished product 11S of drawn shape which is used as the first rail member 11 to be fitted into the frame 1. Any steel alloy such as stainless steel and the like is pulled or drawn into the drawn shape 11S, which is in turn machined into the finished first rail member 11. The drawn shape 11S for the first rail member 11 has a nearly trapezoidal contour in transverse section, which conforms snugly to the first recess 41 shown in FIG. 4. More especially, the drawn shape 11S as shown in FIG. 5 has upside and downside tapered contours 38 and 43, a long side 51, a short side 56 on which a raceway groove 40 of semicircle to be finished later to the accurate raceway 33 is formed to lie at the widthwise middle, straight contours 29 extending in parallel with each other from upside and downside edges of the short side 56 to join together with their related tapered contours 38 and 43 through dents 30, and another straight contours 39 and 44 of a preselected length extending in parallel with each other from ends opposite to the dents 30 of the upside and downside tapered contours 38 and 43 to merge perpendicularly into upside and downside edges of the long side 51. Moreover, the tapered contours 38, 43 on the first rail member 11 is less in length when viewed in transverse section or depth than the tapered contours 24 and 26 of the first recess 41 in the frame 1. Thus, after the first rail member 11 has fitted into the first recess 41 in the frame 1, natural rooms 60 form between the straight contours 25, 27 inside the first recess 41 and the straight contours 39, 44 on the first rail member 11. Moreover, the drawn shape 11S has a thickness L, thanks to which the rail member 11 fits into the first recess 41 in a fashion rising above the inward surface 57 of the frame 1.

Referring to FIG. 6, there is shown the slider body 5 to be incorporated into the slider 2. The slider body 5 is made of a length of the extrusion, on one side of which there is shaped the second recess 42 of rectangle in transverse section to fit over the second rail member 12. With the second recess 42, more particular, an upside contour 45 and a downside contour 47 extend straight in parallel with each other from the mouth to the depth of the second recess 42 so that the widthwise dimension of the second recess 42 remains invariable across the depth. A bottom 46 lies in perpendicular to the upside and downside contours 45 and 47 so that the second recess 42 has the rectangular shape in transverse section defined with the upside and downside contours 45 and 47 as the long sides and the bottom 46 as the long side. Moreover, there are reliefs 36 for excess adhesives or the like at corners where the bottom 46 meets at right angles with the upside and downside contours 45 and 47. The bottom 46 has a relief 37 for excess adhesive lying in a longitudinal direction at widthwise middle. The slider body 5 upon extruding operation is simultaneously formed on a side surface 58 thereof with a pocket 35 of C-shape in transverse section lying just above the second recess 42. A basal part 32 of the upper sealing member 21 fits into the pocket 35.

Figure 7:
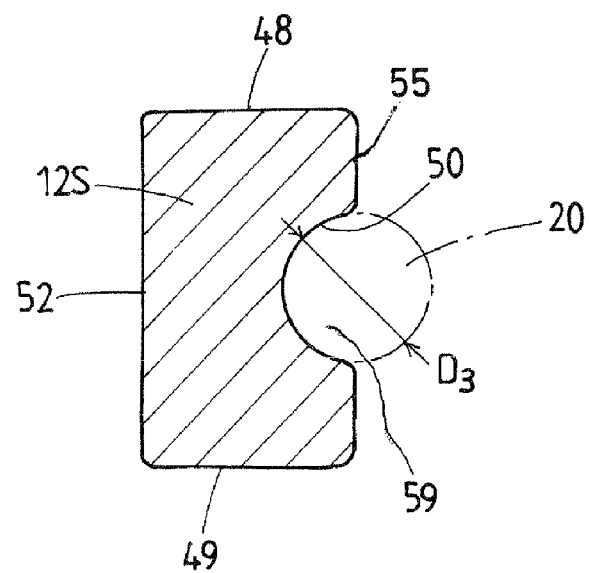
FIG. 7 is a fragmentary enlarged view in transverse section of a second rail member of drawn shape which is a half-finished product for the actuator of FIG. 2, the view showing in detail a location encircled with A in FIG. 2.

Referring to FIG. 7, there is shown a half-finished product 12S of drawn shape which is used as the second rail member 12 to be fitted into the slider body 5. Any steel alloy such as stainless steel and the like is pulled or drawn in lengthwise direction into the drawn shape 12S of rectangular contour in transverse section, which is in turn machined or lathed into the finished second rail member 12. The drawn shape 12S to be finished into the second rail member 12 has a rectangular contour in transverse section, which is larger in width than in depth or thickness to fit into or conforms snugly to the second recess 42 as shown in FIG. 6. More especially, the drawn shape 12S as shown in transverse section has upside and downside contours 48 and 49 extending straight in parallel with each other, a side surface 52 extending in perpendicular to the upside and downside contours 48 and 49 to come into mating with the bottom of the second recess 42, and another side surface 59 opposite to the side surface 52 having a raceway groove 50 of semicircle lying at the widthwise middle. The raceway groove 50 is finished later to the accurate raceway 34. Moreover, the drawn shape 12S has a thickness, thanks to which the rail member 12 fits into the slider body 5 in a fashion rising above the side surface 58 of the slider body 5.

The actuator as shown in FIG. 3 is constructed according to the steps as follows.

In the production of the frame 1, the light-metal alloy is first extruded into the half-finished product of a continuous shape that is formed with constant cross-section. Then, the half-finished product of a continuous shape is machined or worked into the frame 1. Another half-finished product 11S of the drawn shape is cut at a desired length and subjected to the heat treatment into the first rail member 11, which is then thrust from any one lengthwise end of the frame 1 into the first recess 41 defined between the side walls 9. A caulking roller, while moving lengthwise of the concave 23 of the side wall 9, applies the continuous working pressure to the flange 22 to get the flange 22 leaned gradually against the first rail member 11 by incremental plastic deformation. After the caulking operation as stated earlier, the flange 22 urges the first rail member 11 in a way the long side 51 thereof comes into close mating with the bottom 28 inside the first recess 41 and the upside and downside tapered contours 38 and 43 of the first rail member 11 make close engagement with their related tapered contours in the first recess 41 of the frame 1. Moreover, the flange 22 at its free end bites into the shoulder dent 30 of the first rail member 11 thereby to firmly fasten the first rail member 11 in the first recess 41. It will be thus understood that the first rail member 11 can be fastened securely, even though readily, to the frame 1. The first rail members 11 after fastened to the frame 1 are subjected to lathed at their shaped raceway grooves 40 to have the accurate raceways 33.

In the production of the slider body 5, the light-metal alloy is extruded into the half-finished product. Then, the half-finished product is machined or worked into the slider body 5. Another half-finished product 12S of the drawn shape is cut at a desired length and subjected to the heat treatment into the second rail member 12, which is then inserted into the second recess 42 in the slider body 5 and secured to the slider body 5 by means of adhesive. Upon adhesion of the second rail member 12 to the slider body 5, excess adhesive is squeezed out between the side surface 52 of the second rail member 12 and the bottom of the second recess 42 into the reliefs 36 and 37. This helps ensure close engagement between the slider body 5 and the second rail member 12. The adhesion of the second rail member 12 to the slider body 5 as stated earlier is better for the second rail member 12 in which less space is of interest. The second rail members 12 after secured to the slider body 5 are lathed at their shaped raceway grooves 50 to have the accurate raceways 34.

On assembly of slider 2 with the frame 1, there are provided four end caps 4 in all, each of which has a turnaround passage, not shown, to allow the rolling element 20 rolling through there. The end caps 4 are mounted on lengthwise ends of the slider body 5 in connection with the second rail members 12. Thus, there is completed a circulating circuit to get the rolling elements 20 running through there, which is made up of a load passage defined between the raceways 33 and 34, a return passage 16 extending in parallel with the load passage, and a pair of the turnaround passages to communicate the load passage with the related return passage 16. The upper sealing member 21 is installed at the basal part 32 thereof into the pocket 35 and more than one rolling element 20 is charged into the paired circulating circuits. Then, there is provided any retaining member to keep the rolling element 20 against falling away. The slider 2 is moved into the frame 1 while the rolling element 20 rolls in conformity with raceway 33 of the frame 1. The resulting assemblage is equipped with the driving unit including the ball-screw set 54, the motor 3 and so on into the finished actuator. The upper sealing member 21 as shown in FIG. 3 is held in a way the lip 31 thereof reaches deep into the V-shaped concave 23 on the side wall 9 of the frame 1 to make a close sliding contact at the tip thereof with an upper surface of the concave 23. With the actuator constructed as stated earlier, the rolling element 20 is the ball and the raceways 33 and 34 are each made in the form of a gothic arched groove which comes into four point contacts with the rolling element 20. The groove 19 of T-shape in transverse section cut on an outward surface of the side wall 9 is envisaged having therein any instrument including a limit switch, a sensor, and so on.

What is claimed is:

1. An actuator comprising:
an elongated frame having a transverse a section defined by a bottom and a pair of side walls upright at sidewise opposing edges of the bottom,
a slider having a slider body therein and lying between the side walls of the elongated frame in a way moving lengthwise of the side walls through rolling elements,
a driving unit to drive movement of the slider with respect to the elongated frame,
first rail members fastened to inward surfaces of the side walls, one to each side wall, the first rail members each having a first raceway groove to allow the rolling elements to run through, and
second rail members fastened to side surfaces of the slider body facing the inward surfaces of the side walls, one to each side surface, the second rail members having second raceway grooves in opposition to the first raceway grooves;
wherein the side walls of the elongated frame each have a lengthwise first recess of dovetail configuration in the transverse section on the inward surface of the side wall to fit over the first rail member, the dovetail configuration in the first recess being defined by an upper tapered contour and a lower tapered contour which are configured to taper away from the rolling elements to get the first recess larger in width as the upper tapered contour and the lower tapered contour extend from opening edges of the upper tapered contour and the lower tapered contour, and straight contours of the first recess extending in parallel with each other from the upper tapered contour and the lower tapered contour to a bottom of the first recess lying perpendicular to the straight contours, a concave V-shape in the transverse section lying lengthwise above the upper tapered contour of the first recess to extend in proximity to the first recess, and a flange formed lengthwise between the first recess and the concave V-shape, the flange being forcibly deformed against the first rail member;
wherein the first rail members each have a wedged configuration of a trapezoid in the transverse section complementary to the dovetail configuration of the first recess, the wedged configuration being defined with an upper tapered contour and a lower tapered contour mating with the upper tapered contour and the lower tapered contour of the first dovetail recess, dents lying next to the upper tapered contour and the lower tapered contour; an upper straight contour and a lower straight contour extending next to the dents in parallel with each other, a short side of the trapezoid having the first raceway groove at a middle thereof, straight contours directly adjacent to the upper tapered contour and lower tapered contour of the first rail members extending in parallel with each other from ends opposite to the dents of the upper tapered contour and the lower tapered contour to form rooms between the straight contours of the first rail member and the straight contours of the first recess in the elongated frame, and a long side of the trapezoid merged perpendicularly with the straight contours of the first rail member and abutted against the bottom of the dovetail configuration in the first recess,
wherein each of the first rail members is held in each of the first recesses in the elongated frame by each of the flanges which are pressed down against each of the first rail members in a relation that each of distal ends of the flanges bites into each of the dents next to the upper straight contours, and
wherein the slider on the side surface of the slider body has second recesses of a rectangular configuration in a transverse section and the second rail members each have a rectangular shape complementary to the second recesses in the slider, and the second rail members fit into the second recesses and adhere to the second recesses with an adhesive.

* * * * *